Nov. 28, 1967   A. E. BALOCCA ETAL   3,355,059
LAMINATE WITH SEVERABLE PORTION
Filed May 13, 1964

INVENTORS
ALFRED EDWARD BALOCCA
RICHARD LEO JOOSTEN
BY
Donald A. Kaul
ATTORNEY

United States Patent Office 3,355,059
Patented Nov. 28, 1967

3,355,059
LAMINATE WITH SEVERABLE PORTION
Alfred Edward Balocca, Wheaton, and Richard Leo Joosten, Cary, Ill., assignors to American Can Company, New York, N.Y., a corporation of New Jersey
Filed May 13, 1964, Ser. No. 367,048
13 Claims. (Cl. 220—53)

ABSTRACT OF THE DISCLOSURE

A laminate construction for a can end has a metal sheet with an aperture, a manually removable aluminum foil patch on one side of the sheet and a thinner aluminum foil patch on the other side adhered to the sheet and to the manually removable patch through the aperture by an adhesive system which assures removal of the portion of the thinner patch which overlies the aperture along with the removable patch when it is peeled from the sheet.

---

Figure 1:
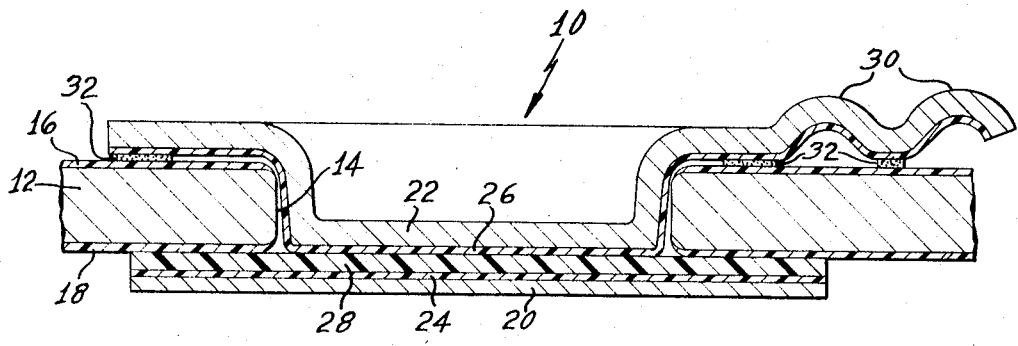

This invention relates to laminates and more particularly it relates to an improved laminated construction having a manually severable portion.

It has been found that, in certain instances, when generally similar layers are superposed to opposite surfaces of a sheet having an aperture therein, and when such layers are adhered together through the aperture, the resulting lamination forms a quite suitable expedient for sealing off the aperture. Furthermore, if one of the layers is fabricated to be slightly more tearable than the other layer, pulling on the less tearable layer will cause that portion of the more tearable layer which is adhered thereto through the aperture, to tear or sever and hence to pull away from the lamination while remaining in adherence to the less tearable layer. Such a laminated construction finds particular utility in the field of dispensing containers wherein the sheet with the aperture therein can be a container wall having a dispensing opening therein. Thus, severing of the layers overlying the aperture serves to open the aperture and thereby permit dispensing of the container contents.

Naturally, one suitable method for forming such a lamination as was previously described, wherein layers are superposed on opposite sides of an apertured sheet and are adhered together through the aperture, is to permanently secure each layer to the sheet as by welding and to spot weld the sheets to each other through the aperture. However, such a lamination technique cannot be utilized where it is desired to have the layers manually severable. Instead, in such a construction, at least one of the layers must be loosely secured to the sheet so it can be easily removable by hand without the use of tools. Furthermore, within the aperture, the bond between layers must be strong enough to adhere the tearable layer to the layer to be manually pulled away, but yet must not be too strong so as to prevent that portion of the tearable layer with the limits of the aperture from tearing away from the remainder of the layer. Previous attempts to form such a lamination have been unsuccessful due to the difficulty in achieving the proper amount of adhesion at the proper locations.

It is, therefore, an object of the present invention to provide an improved lamination.

Another object of the present invention is to provide a laminate having a portion which can be manually severed without the use of tools.

Another object of this invention is to provide a laminate having a central or medial layer fabricated of rigid metal such as tin plate.

Another object of this invention is to provide a laminate with a manually severable portion which, when removed, will not present any sharp edges which could cut the fingers.

Numerous other objects and advantages of the invention will be apparent as it is better understood from the following description, which, taken in connection with the accompanying drawings, discloses a preferred embodiment thereof.

The foregoing objects are attained by providing a laminate formed of a continuous, preferably planar sheet having an aperture therein and a layer of generally non-elastomeric material superposed to each side of said sheet in overlying relationship to the aperture. One of the layers is firmly bonded to one surface of the sheet by means of synthetic resinous coatings. The other of said layers is loosely or weakly bonded to the opposite surface of the sheet by means of the same or different synthetic resinous coatings. In the area of the aperture, the two layers are bonded to one another by the synthetic resin disposed between them.

The firmly bonded layer is formed of a material which is more readily tearable than is the material of the weakly bonded layer. Thus, when an end of the weakly bonded layer is manually grasped and pulled, it lifts away from the sheet and tends to cause that portion of the firmly bonded layer adhered to it to pull through the aperture. Since the firmly bonded layer is formed of a more tearable material, that portion of it which lies within the aperture tears away from the remainder thereof and passes through the aperture in adhered attachment to the undersurface of the less tearable layer. The result is that, as the less tearable layer is manually lifted away from the sheet, a portion of the laminate is severed or torn out, and the remaining laminate has a hole or perforation therein.

Figure 2:
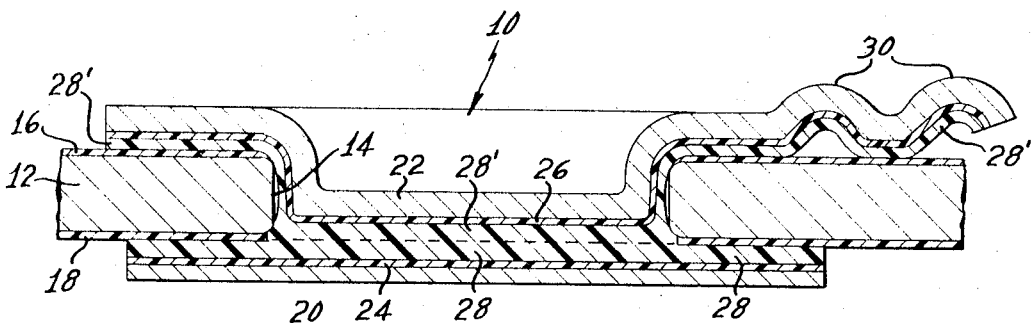

Referring to the drawings:

FIGURE 1 is a fragmentary transverse sectional view through a laminate formed in accordance with the principles of the present invention; and FIGURE 2 is a fragmentary transverse sectional view through a slightly modified form of laminate.

Referring now to FIGURES 1 and 2, a laminate generally designated 10 is shown in cross-section to indicate the component layers thereof. The main or central layer of the laminate is formed by a preferably planar continuous sheet 12 having at least one shaped aperture means 14 therein. The sheet 12 is fabricated of a metallic material, preferabaly tin plate but permissibly aluminum or other suitable metal. The term "tin plate" will be well understood by those skilled in the art as referring to sheet steel provided with a coating of tin in the range of $15 \times 10^{-6}$ to $60 \times 10^{-6}$ inches. The preferred thickness of the sheet 12 is in the order of 0.010″ and the sheet itself can form either the body wall or end wall of a metallic dispensing container such as a metal can or an end closure for a paper or plastic bodied container. The aperture means 14 can be formed of any suitable shape and can be comprised of more than one aperture, if desired.

A micro-thin coating of material such as a synthetic resin is applied to the opposite surfaces of the sheet 12. If the sheet 12 is to be a container wall, then the surface which is to form the exterior thereof is suitably coated with the alkyd varnish 16 having a thickness usually no greater than 0.0005″. That surface which is to form the interior of the container is coated with a polymeric layer of organic material 18 having an optimum thickness no greater than 0.0005″. The interior coating 18 prevents any chemical reaction from occurring between the container product and the tin plate sheet 12 and also serves to improve adhesion to the sheet 12, as will be presently described. Suitable for the inside coating 18 are standard inside can coatings.

A pair of layers or patches 20 and 22 are superposed to the sheet 12 in overlying relation to the aperture means 14 with the layer 20 being juxtaposed to the inner surface coating 18 and the layer 22 being juxtaposed to the outer surface coating 16. Each of the layers 20 and 22 is fabricated of a generally non-elastomeric material such as aluminum foil. It is essential that the layer 20 be more tearable than the layer 22 and this can be accomplished in various ways. One suitable manner for effecting this variation in tearability is to fabricate the layer 20 of thin, hard aluminum foil having a thickness in the order of 0.0015″ and to fabricate the layer 22 of thicker, soft aluminum foil having a thickness in the order of 0.0040″. In such a construction, the layer 20 is considerably more brittle than the layer 22 and will therefore be more tearable or frangible.

A thin polymeric coating 24, preferably a synthetic resin, is applied to one surface of the layer 20 and a similar coating 26 is applied to one surface of the layer 22, with the coated surfaces 24 and 26 facing toward one another. The coatings 24 and 26 can be fabricated of the same material as the layer 18 and are formed with the same thickness as that layer, i.e. less than 0.0005″. The purpose of the coatings 24 and 26 is to correct variable surface conditions on the layers 20 and 22, as commercially received, and to enhance the adhesion or bondability of such layers.

A heat-bondable adhesive layer 28 is utilized to adhere the layer 20 to the sheet 12 and also to the layer 22. The adhesive layer 28 has a thickness of approximately 0.002″ and is formed of some suitable synthetic resin such as a polyurethane which is adherently compatible with the coating layers 24 and 26. Preferably, the adhesive 28 is applied to the layer 20, or more precisely to its coating 24, after which it is heat activated and pressed into contact with the coating 18 on the sheet 12. The result is a laminated construction wherein the layer 20 is firmly adhered to the sheet 12.

Within the boundaries of the aperture means 14, the adhesive layer 28 is exposed and this exposed adhesive serves to secure the layer 22 to the layer 20. To this end, that portion of the layer 22 overlying the aperture is embossed downward, as shown, until its coating layer 26 contacts and bonds to the adhesive layer 28. Since the adhesive 28 bonds equally well to the coatings 24 and 26, the result is a construction where the layers 20 and 22 are bonded or adhered to one another within the boundaries of the aperture means 14. Although, as illustrated, the layer 20 remains planar while the layer 22 is embossed into the plane of the sheet 12, such a construction is only exemplary and the present invention is not limited thereto. If desired, the layer 22 could remain planar and the layer 20 could be embossed into the plane of the sheet 12, or both layers 20 and 22 could be embossed toward one another.

One end of the layer 22 is corrugated with wrinkles or ridges 30 to facilitate manual gripping thereof.

The foregoing matter is common to both the modification of FIGURE 1 and that of FIGURE 2 and it can be seen that in both modifications, the laminate 10 thus formed is hermetic in that no fluid flow can occur across or through it since the aperture means 14 is firmly sealed. It may, however, be desirable to permit fluid flow through the laminate, such as if the laminate 10 is utilized in a container wall, and in such an instance, the aperture means 14 can be opened by manually grasping the layer 22 at its end 30 and pulling it away from the sheet 12. When the layer 22 is pulled away from the sheet, the pulling force is transmitted to the centrally adhered portion of the layer 20, and since the layer 20 is more tearable than the layer 22, the central adhered portion of the layer 20 tears away from the remainder thereof and remains attached to the coated surface of the layer 22. Therefore, when the layer 22 has been fully pulled off or removed, a portion of the layer 20 has been severed or torn away and the aperture means 14 is thus opened to permit fluid flow through the laminate 10.

In order to prevent the ends of the layer 22 from being bent or turn during handling, processing or shipping of the laminate 10, such ends are suitably secured to the varnish coating 16 on the sheet 12. In the modification shown in FIGURE 1, a low-peel strength, hot-melt adhesive 32 is applied beneath the ends of the layer 22 by being interposed between the coating 26 and the varnish layer 16. The term "hot melt" is used to denote any 100% solid thermoplastic adhesive composition and, as such, includes pressure-sensitive materials which are tacky at room temperature and also heat-bondable materials which become tacky at elevated temperatures. The thickness of the adhesive 32 is approximately 0.001″ and although it is sufficient to secure or tack down the ends of the layer 22, it is nevertheless easily severable upon the application of manual force to the layer 22 to permit that layer to be peeled or separated from the sheet 12.

In the modification shown in FIGURE 2, a thin layer of the adhesive material 28′ is applied continuously to the coating 26 on the layer 22. Where the layers 20 and 22 are embossed together, the layer 28′ coheres with the layer 28. At the ends of the layer 22, the adhesive 28′ is secured to the varnish coating 16 to thus tack down the ends. The thickness of the adhesive layer 28′ is less than 0.0005″ and has low-peel strength adhesion so as to be strong enough to tack down the ends, yet nevertheless is easily separable upon the application of manual peeling force to permit that layer to be peeled or separated from the sheet 12.

It will be apparent to those skilled in the art that a laminate 10 formed in the previously described manner will be strong and is also an effective fluid barrier. Since the layers 20 and 26 are non-elastomeric, they tend to resist deformation in the area of the aperture means even if a high pressure differential is present from one side of the laminate to the other. The layer 20 is firmly bonded to the sheet 12 in overlying relationship to the aperture means 14 to render the laminate completely fluid impermeable. However, when it is desired to perforate or sever the laminate to allow fluid flow therethrough, mere manual pulling on the layer 22 is adequate to lift or peel that layer away from the sheet 12 and thereby tear away a portion of the layer 20. It can thus be seen and appreciated that no tools need be used to sever the laminate and that even though the laminate is quite strong and efficient, it can easily be severed by hand, when desired.

It is thought that the invention and many of its attendant features will be understood from the foregoing description, and it will be apparent that various changes may be made in the form, construction and arrangement of parts without departing from the spirit and scope of the invention or sacrificing all of its material advantages, the form hereinbefore described being merely a preferred embodiment thereof.

We claim:

1. A laminate having a severable portion and comprising:
   a continuous metallic sheet having aperture therein;
   a first non-elastomeric layer juxtaposed to one side of said sheet in overlying relationship to said aperture;
   a second non-elastomeric layer juxtaposed to the opposite side of said sheet in overlying relationship in said aperture;
   said second layer being fabricated of a material of uniform tearability which is more readily tearable than the material of said first layer;
   an adhesive material interposed between said sheet and said second layer to secure said second layer to said sheet;
   said adhesive material extending across said aperture;
   one of said non-elastomeric layers having an embossment extending into said aperture to thus bond portions of said first and second non-elastomeric layers to one another by said adhesive material; and the other of said non-elastomeric layers being substantially flat;

means for removably attaching the unbonded portion of said first layer to said sheet, marginal to said aperture; and said first layer being manually engageable to be pulled away from said sheet to thus cause the bonded portion of said second sheet to tear away and remain bonded to said first sheet, thereby opening said aperture.

2. A laminate as defined in claim 1 wherein both sides of said sheet are provided with a synthetic resin coating.

3. A laminate as defined in claim 2 wherein that surface of each of said non-elastomeric layers facing said sheet is provided with a polymeric coating.

4. A laminate as defined in claim 3 wherein the means for removably attaching the unbonded portion of said first layer is a hot-melt adhesive.

5. A laminate as defined in claim 3 wherein the means for removably attaching the unbonded portion of said first layer is a thin coating of said adhesive material interposed between said sheet and said first layer.

6. A laminate as defined in claim 3 wherein one end of said first layer is corrugated to facilitate manual gripping thereof.

7. A laminate for a can end having a severable portion and comprising:

a continuous sheet of tin plate having an aperture therein;

a coating of alkyd varnish applied to one surface of said sheet and thereby defining its upper side;

an adhesion-promoting coating applied to the other surface of said sheet and thereby defining its underside;

a lower aluminum foil patch juxtaposed to the underside of said sheet in overlying relationship to said aperture;

an upper aluminum foil patch juxtaposed to the upper side of said sheet in overlying relationship to said aperture;

said lower patch being of uniform tearability and more readily tearable than said upper patch;

an adhesion-promoting coating overlying that surface of each of said patches which is disposed toward said sheet;

a heat-bondable synthetic resinous adhesive material disposed between the adhesion-promoting coating on said lower patch and the adhesion-promoting coating on the underside of said sheet to thereby adhere said lower patch to said sheet;

said adhesive material extending across said aperture;

at least one of said patches being embossed toward said sheet within the boundaries of said aperture to thus bond a portion of said lower patch to an aligned portion of said upper patch by means of said adhesive material;

said upper patch having one end thereof corrugated to facilitate manual gripping thereof;

means for adhering at least part of the unbonded portion of the upper patch to said sheet; and said laminate having a severable portion which can be removed by manually grasping the corrugated end of said upper patch and lifting said upper patch away from said sheet, the removal of said upper patch thus causing the bonded portion of said lower patch to tear away and remain bonded to said upper patch, thereby opening said aperture to provide a perforation in said laminate.

8. A laminate as defined in claim 7 wherein the means for adhering at least part of the unbonded portion of said upper patch is a hot-melt adhesive disposed between the adhesion-promoting coating on said upper patch and the varnish coating on said sheet.

9. A laminate as defined in claim 7 wherein the means for adhering at least part of the unbonded portion of said upper patch is a layer of said adhesive material disposed between the adhesion-promoting coating on said upper patch and the varnish coating on said sheet, and wherein the adhesive layer used to adhere the upper patch to the sheet it merges with is thinner than the adhesive layer used to adhere the lower patch to the sheet.

10. A laminate as defined in claim 9 wherein the adhesive layer used to adhere the upper patch to said sheet is less than 0.0005″ and the adhesive layer used to adhere the lower patch to said sheet is approximately 0.002″.

11. A laminate as defined in claim 7 wherein the thickness of said sheet is in the order of 0.010″, the thickness of said varnish and adhesion-promoting coating is less than 0.0005″, and the thickness of said adhesive material is in the order of 0.002″.

12. A laminate as defined in claim 11 wherein the thickness of said lower patch is approximately 0.0015″ and the thickness of said upper patch is approximately 0.0040″.

13. The laminate defined in claim 7 wherein said embossment is on said upper patch and said lower patch is substantially flat.

References Cited
UNITED STATES PATENTS

| | | | |
|---|---|---|---|
| 2,147,004 | 2/1939 | Wark et al. | 220—53 |
| 2,870,935 | 1/1959 | Houghtelling | 220—53 |
| 3,101,879 | 8/1963 | Meyer et al. | 229—7 |
| 3,251,515 | 5/1966 | Henchert et al. | 222—487 |

JOSEPH R. LECLAIR, *Primary Examiner.*

THERON E. CONDON, *Examiner.*

G. T. HALL, *Assistant Examiner.*